Legend:
- Blanket Region №1
- Blanket Region №2
- Blanket Region №3
- Blanket Region №4
- + Seed United States Patent Office 3,158,543
Patented Nov. 24, 1964

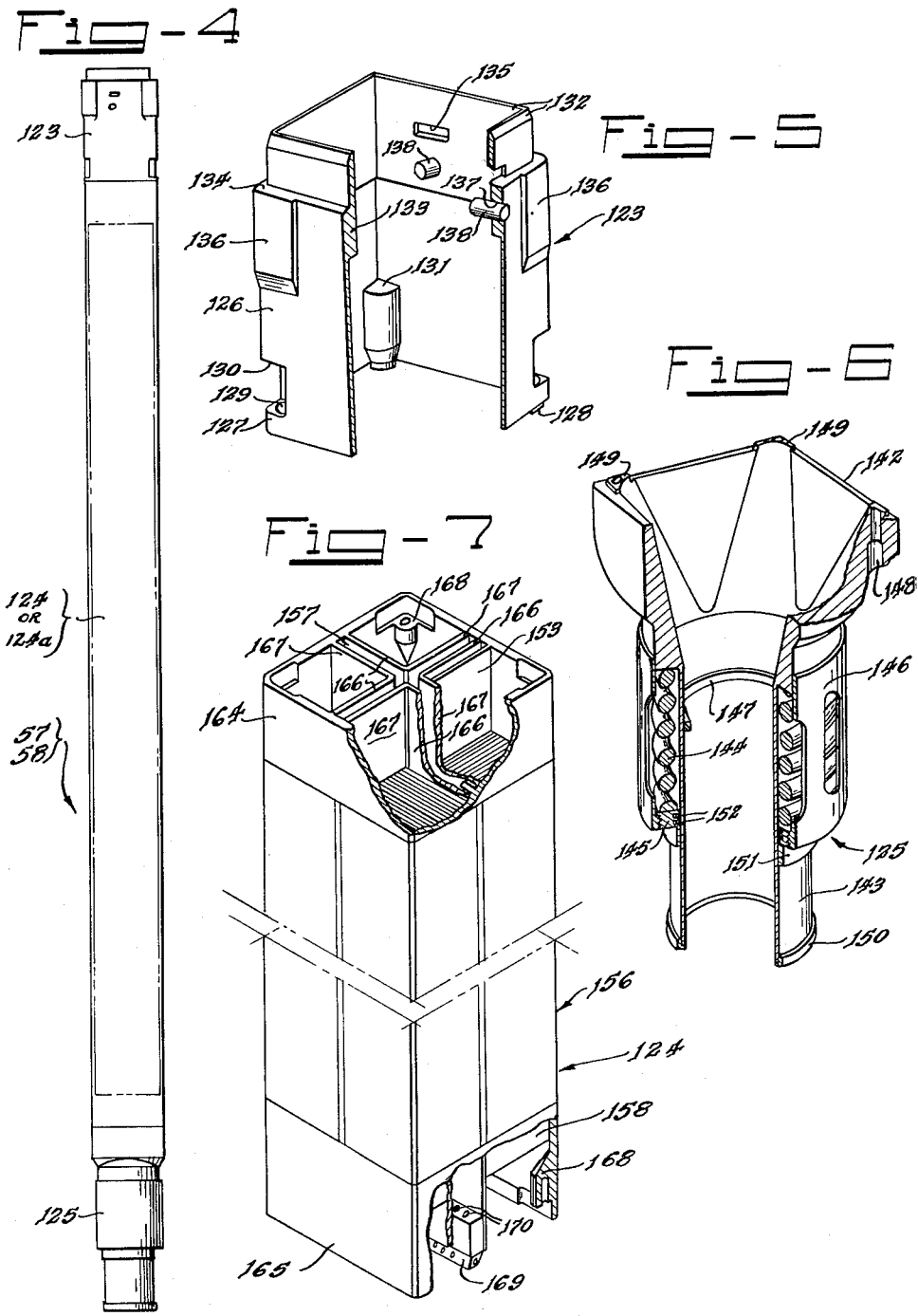

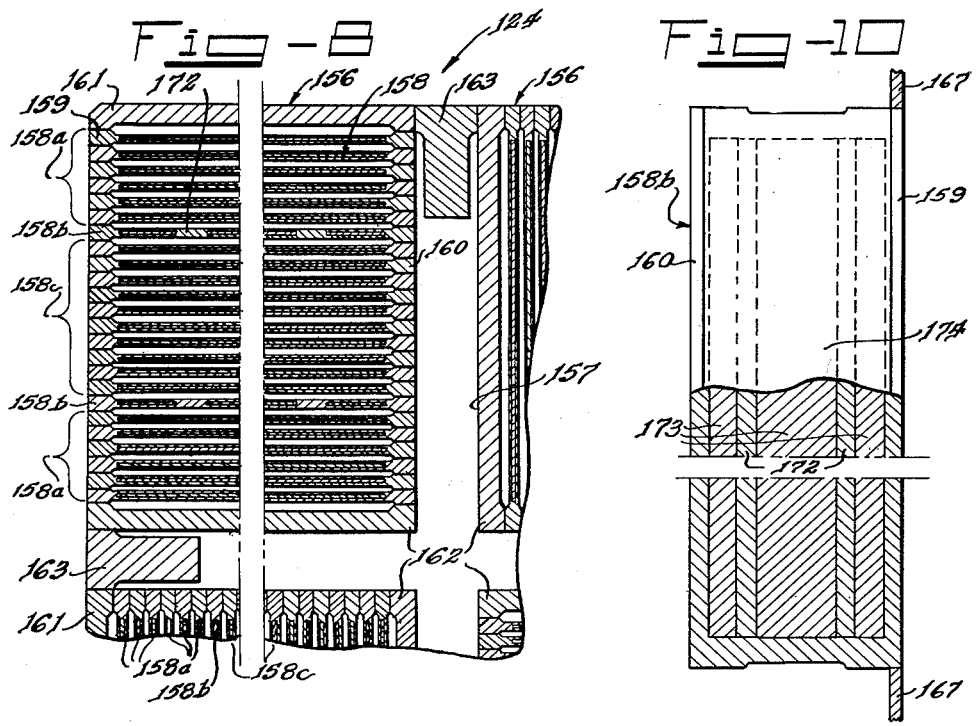
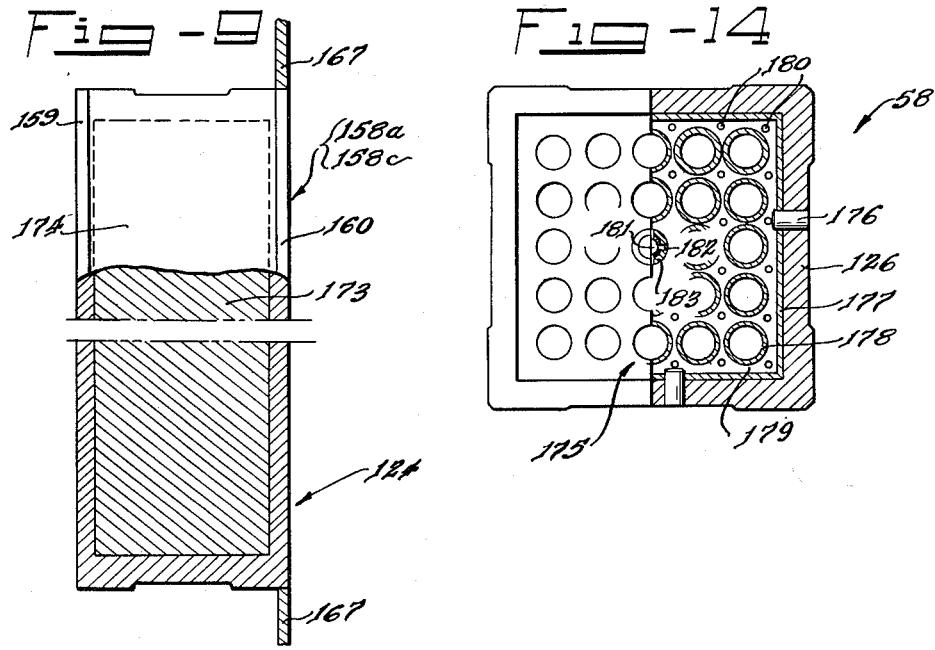

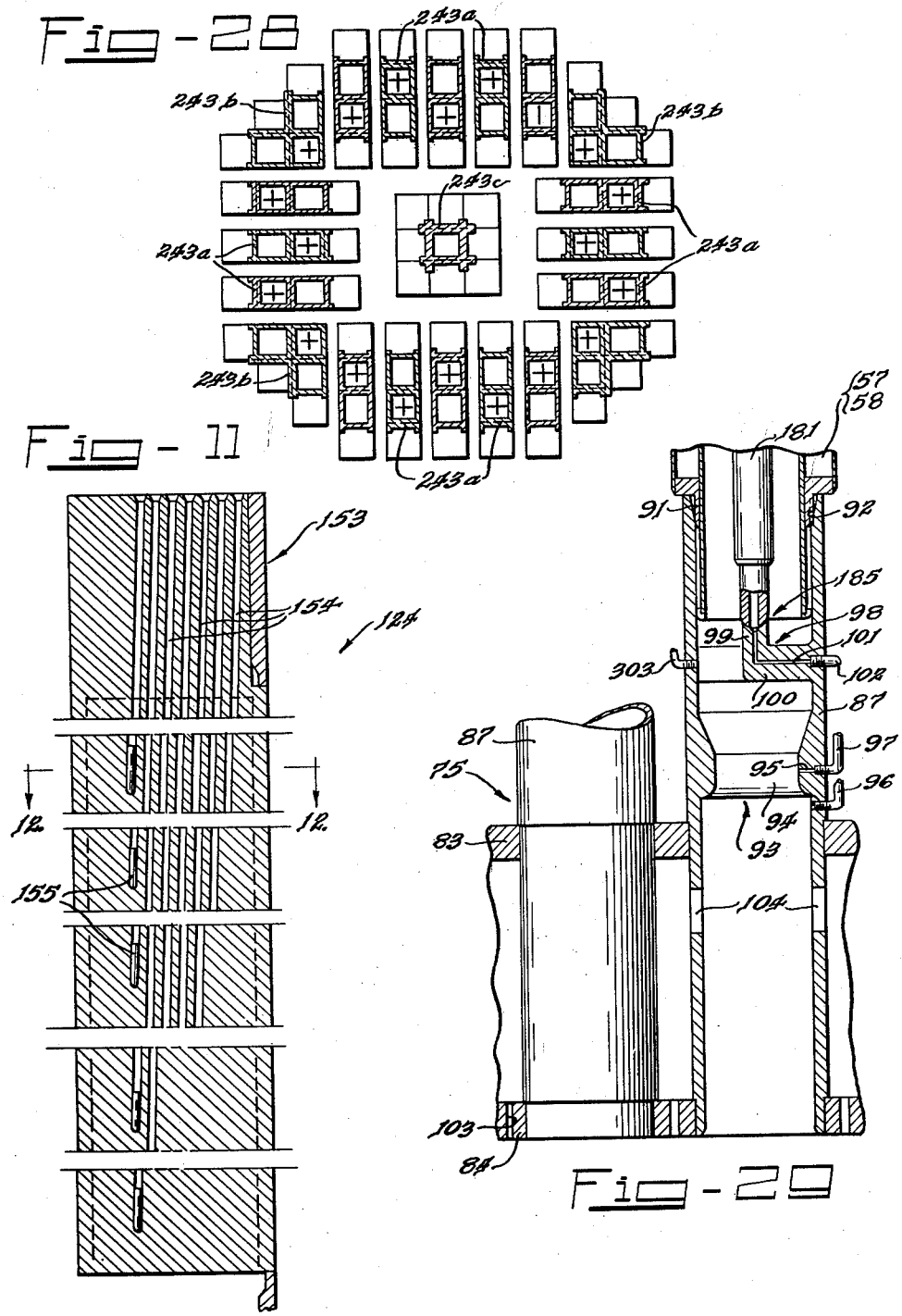

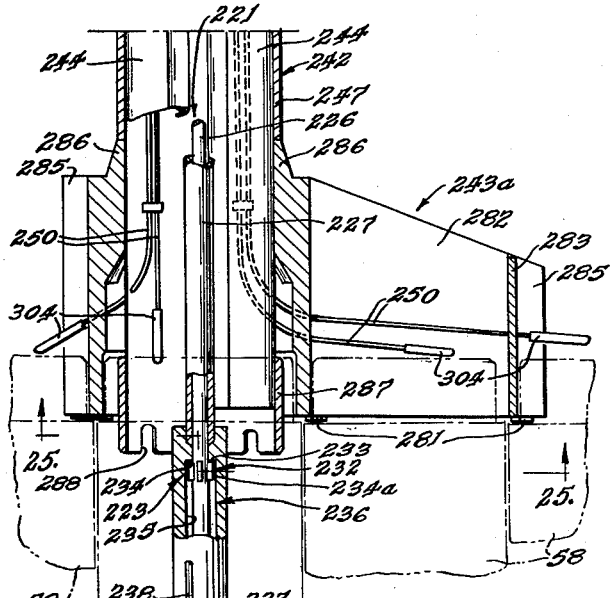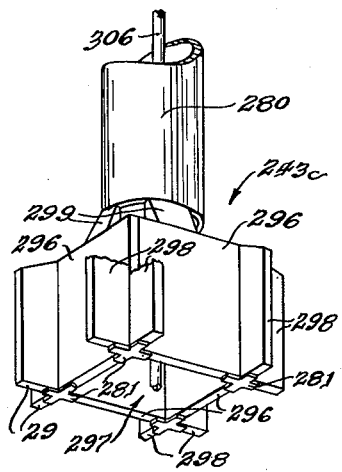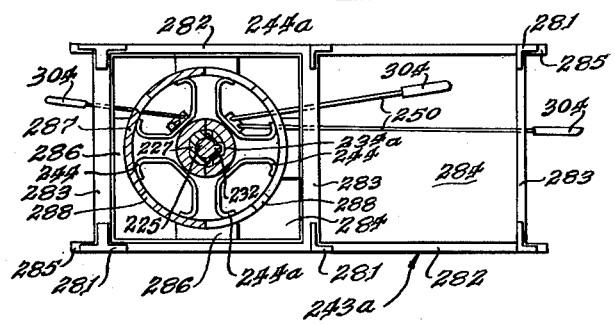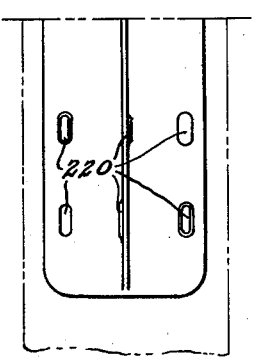

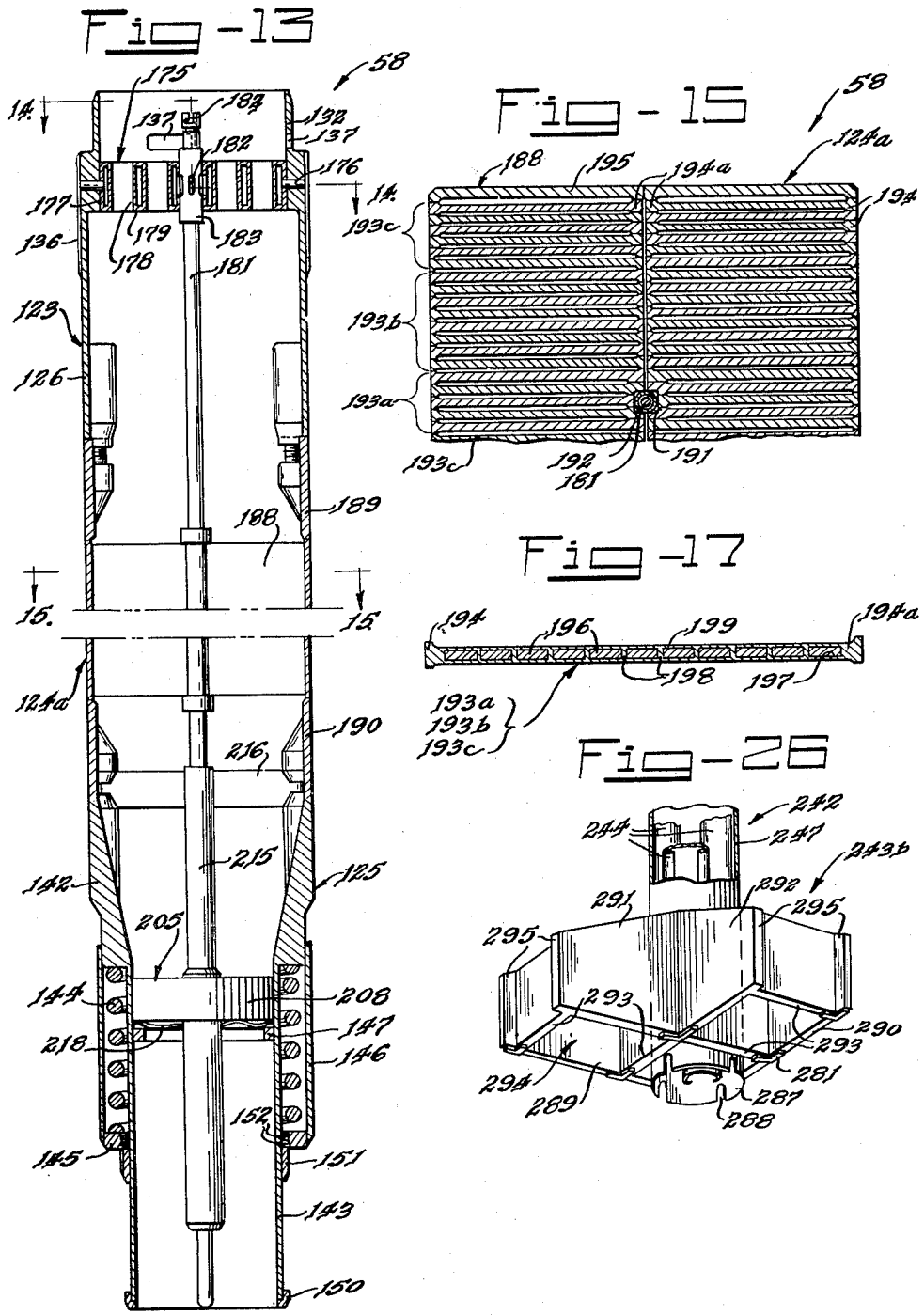

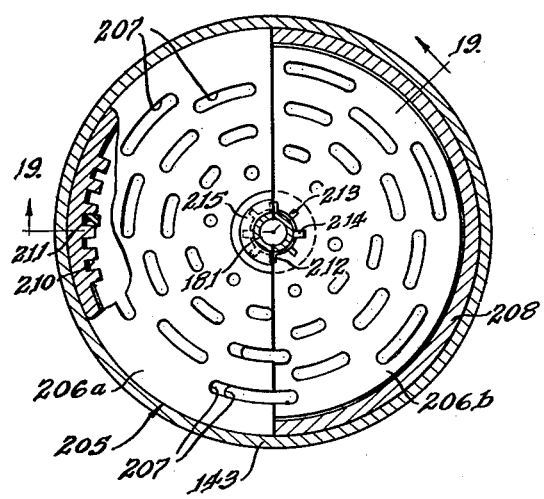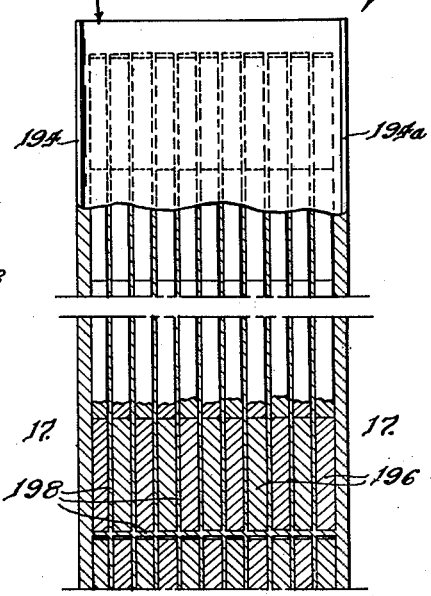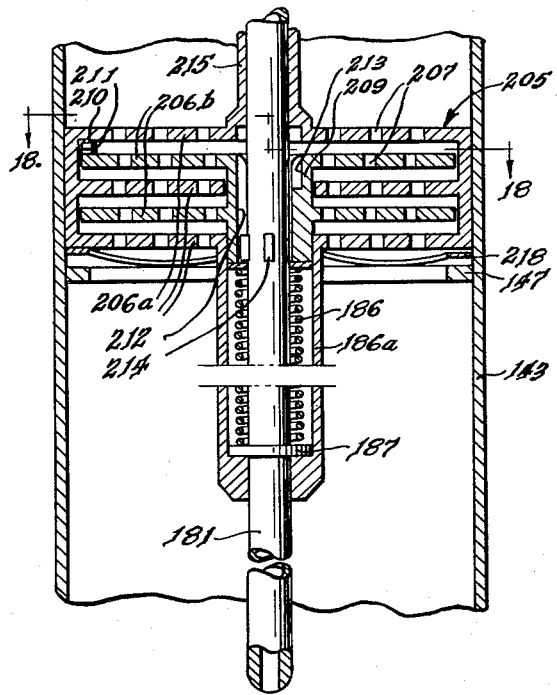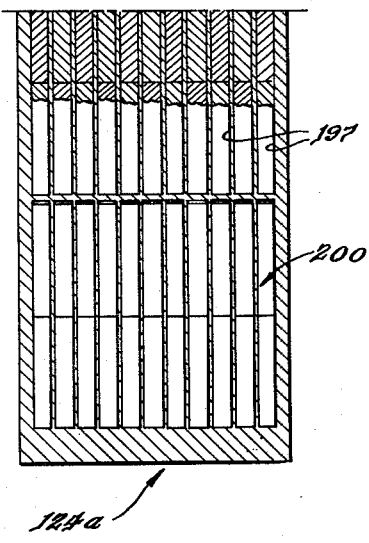

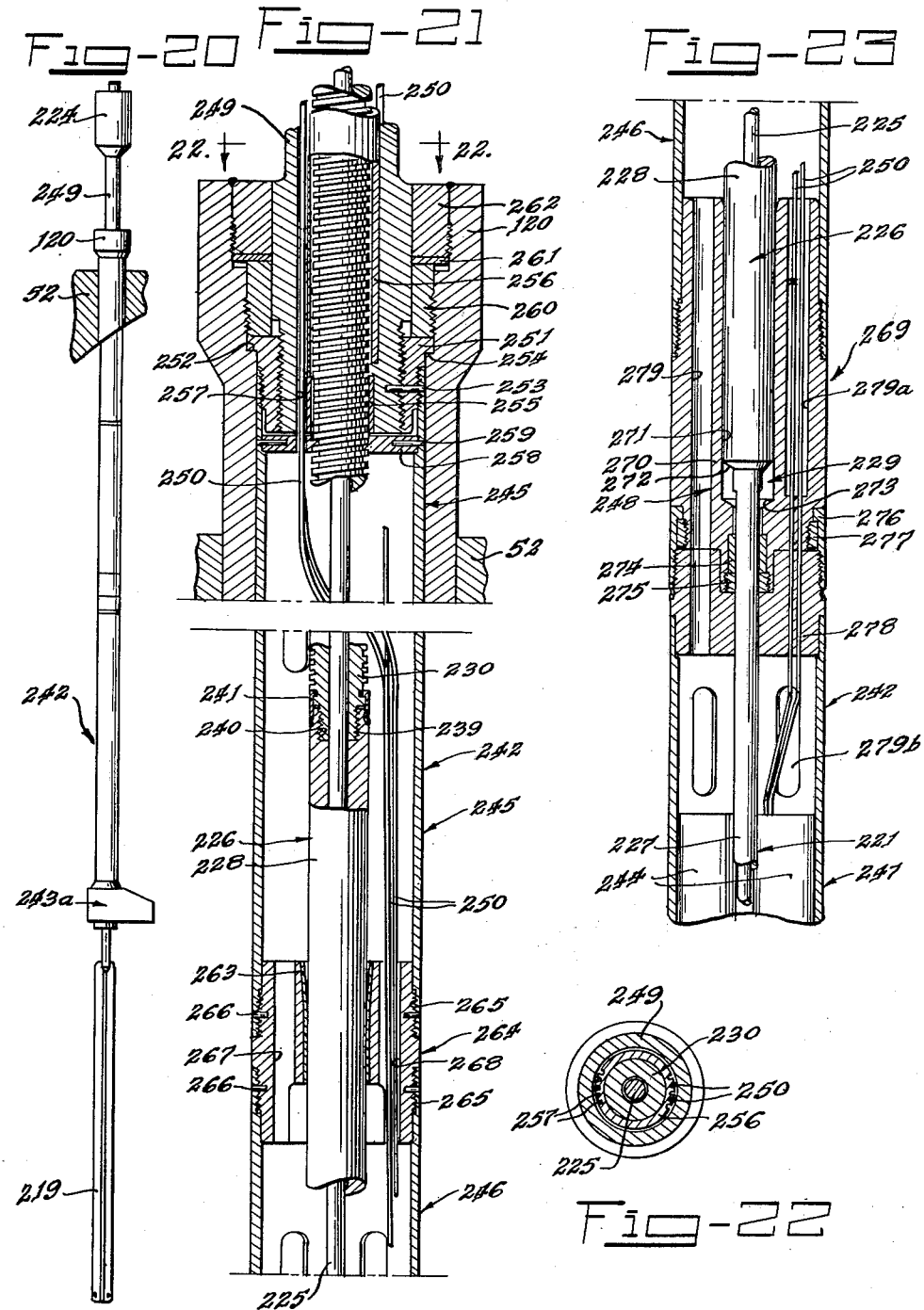

3,158,543
FUEL ASSEMBLY SUPPORT SYSTEM FOR NUCLEAR REACTOR
Jerome Sherman, Pittsburgh, John E. Sharbaugh, West Mifflin, William L. Fauth, Jr., Canonsburg, Nunzio J. Palladino, Centre County, and Philip G. De Huff, Bethel Park, Pa., assignors, by mesne assignments, to the United States of America as represented by the United States Atomic Energy Commission
Original application Aug. 14, 1959, Ser. No. 833,898, now Patent No. 3,060,111, dated Oct. 23, 1962. Divided and this application June 4, 1962, Ser. No. 267,838
3 Claims. (Cl. 176—17)

This application is a division of Sherman et al. application Serial No. 833,898, filed August 14, 1959, now Patent No. 3,060,111, issued October 23, 1962.

This invention relates generally to nuclear reactors, and more specifically to nuclear reactors designed to be used as a source of heat in central station power plants.

It is known that nuclear reactors can be used for the production of useful power and the 1958 Geneva Conference volume on the Shippingport Pressurized Water Reactor describes a pressurized water reactor which has been used in a central station power plant. It is accepted at present that such a power plant is not competitive economically with conventional coal and oil fired boilers. The major objective of reactor designers and engineers at present is to bring costs down to the point where economical power can be produced.

The main purpose of the Shippingport plant has always been to advance the technology of pressurized water reactors rather than to generate economical electrical power.

The particular reactor core described and claimed herein is similar to the Shippingport reactor both in construction and purpose and in fact is designed to occupy the same pressure vessel when the first core can no longer be ued. The new core embodies many improvements on the old core all of which taken together bring closer the day that economical electric power may be obtained from the atom. Since the function of the reactor is also to obtain data to contribute to the advancement of reactor technology, provision is made for extensive instrumentation.

It is accordingly an object of the present invention to develop a pressurized water reactor capable of producing power at a lower cost than those now in operation.

It is a further object of the present invention to develop a novel fuel assembly hold-down mechanism for such a reactor.

It is also an object of the present invention to develop a reactor including means for varying the flow of coolant through the fuel assemblies without removing them from the reactor.

It is a further object of the present invention to develop a nuclear reactor having extensive instrumentation to provide data necessary in evaluating the technical aspects of electrical power production from atomic fuel.

The reactor will first be described in general language and will then be described specifically.

The reactor consists of a pressure vessel and closure head therefor containing a seed and blanket type core containing highly enriched uranium-235 as the seed material and natural uranium in the form of uranium dioxide as the blanket material. The seed fuel assemblies are disposed in an approximately circular arrangement with blanket fuel assemblies disposed within and around the annular seed. The shells of the fuel assemblies are identical in form. The seed asemblies include a cluster of highly enriched uranium-zircalloy alloy fuel plates while the blanket assemblies include a cluster of natural uranium ($UO_2$) fuel plates. A flow of light water under pressure passes upwardly through the fuel assemblies to act as coolant and moderator. The blanket assemblies include a variable orifice device on the coolant intake side of the fuel plates so that the flow of coolant may be varied remotely without removing the assembly from the reactor.

The reactivity of the core is controlled by hafnium cruciform control rods and fixed burnable poison located in the seed. The control rods operate in cruciform channels provided in the seed fuel assemblies.

The fuel assemblies rest freely in a bottom support and are held down by control rod shrouds which are provided to shield the control rods from cross flow in the upper part of the pressure vessel.

The core is extensively instrumented with some of the instrumentation leads being conducted out of the pressure vessel through the shrouds and others being conducted through the pressure vessel through a flange held between the pressure vessel and the closure head.

The invention will next be described with reference to the accompanying drawings wherein:

FIG. 3 is a fragmentary view showing that portion of FIG. 1 enclosed by the dot and dash line 3 of FIG. 1;

FIG. 4 is an elevational view of a fuel assembly for the reactor;

FIG. 5 is a perspective view, partly broken away, of the top extension bracket of the fuel assembly shown in FIG. 4;

FIG. 6 is a perspective view, partly broken away, of the bottom extension bracket of the fuel assembly shown in FIG. 4;

FIG. 7 is a perspective view, partly broken away, of a fuel cluster employed in a seed assembly including an instrumented fuel plate;

FIG. 8 is a sectional view showing one subassembly completely and other subassemblies partially of the seed assembly shown in FIG. 7;

FIG. 9 is an elevational view, partially in section, of a typical seed fuel plate;

FIG. 10 is an elevational view, partially in section, of a seed fuel plate containing burnable poison;

FIG. 11 is a vertical sectional view of an instrumented seed plate of which the top portion is shown in FIG. 7;

FIG. 12 is a horizontal sectional view taken along the line 12—12 of FIG. 11;

FIG. 13 is a vertical sectional view of a blanket fuel assembly;

FIG. 14 is a view partially in plan and partially in section taken along the line 14—14 in FIG. 13;

FIG. 15 is a partial horizontal sectional view taken along the line 15—15 in FIG. 13;

FIG. 16 is a view partly in elevation and partly in plan of a blanket fuel plate;

FIG. 17 is a horizontal sectional view taken along the line 17—17 in FIG. 16;

FIG. 18 is a plan view, partially in section, taken along the line 18—18 of FIG. 19, showing the variable orifice device;

FIG. 19 is a vertical sectional view of the variable orifice device taken along the line 19—19 of FIG. 18;

FIG. 20 is an elevational view of a control rod assembly;

FIG. 21 is a vertical sectional view of the upper portion of the control assembly;

FIG. 22 is a horizontal sectional view taken along the line 22—22 of FIG. 21;

FIG. 23 is a vertical sectional view of a central portion of the control assembly showing a disconnect device;

FIG. 24 is a vertical view, partly in cross section, of the lower portion of the control assembly, illustrating the manner in which a control rod shroud holds down the fuel assemblies;

FIG. 25 is a bottom view, partly in section, taken on the line 25—25 of FIG. 24;

FIG. 26 is a perspective view of a corner module frame;

FIG. 27 is a perspective view of a center module frame;

FIG. 28 is a schematic plan view illustrating the module frame fuel assembly support pattern;

FIG. 29 is a view taken partly in cross section showing the bottom support;

Figure 1:
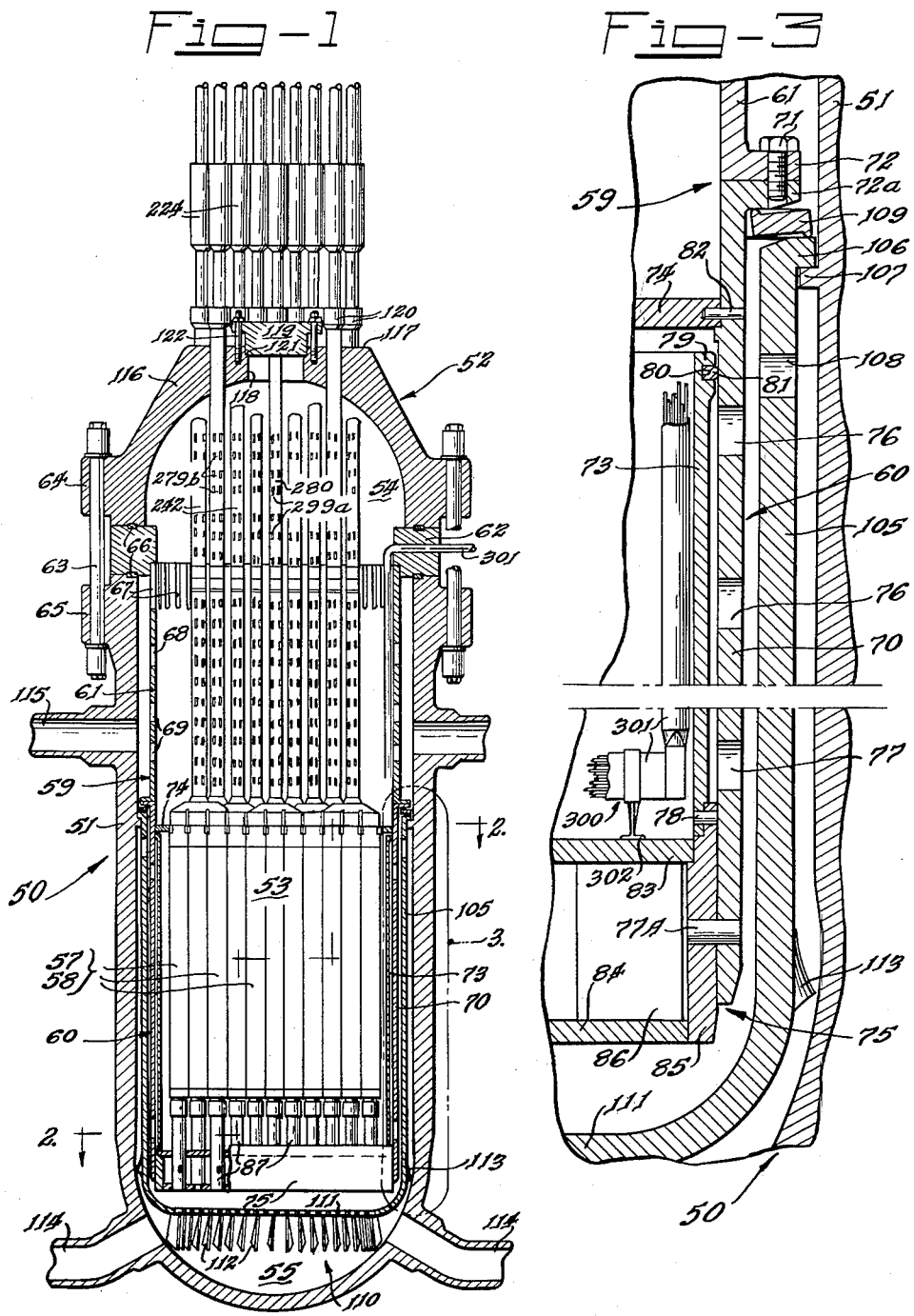
FIG. 1 is a vertical sectional view of a nuclear reactor constructed in accordance with this invention.
Figure 2:
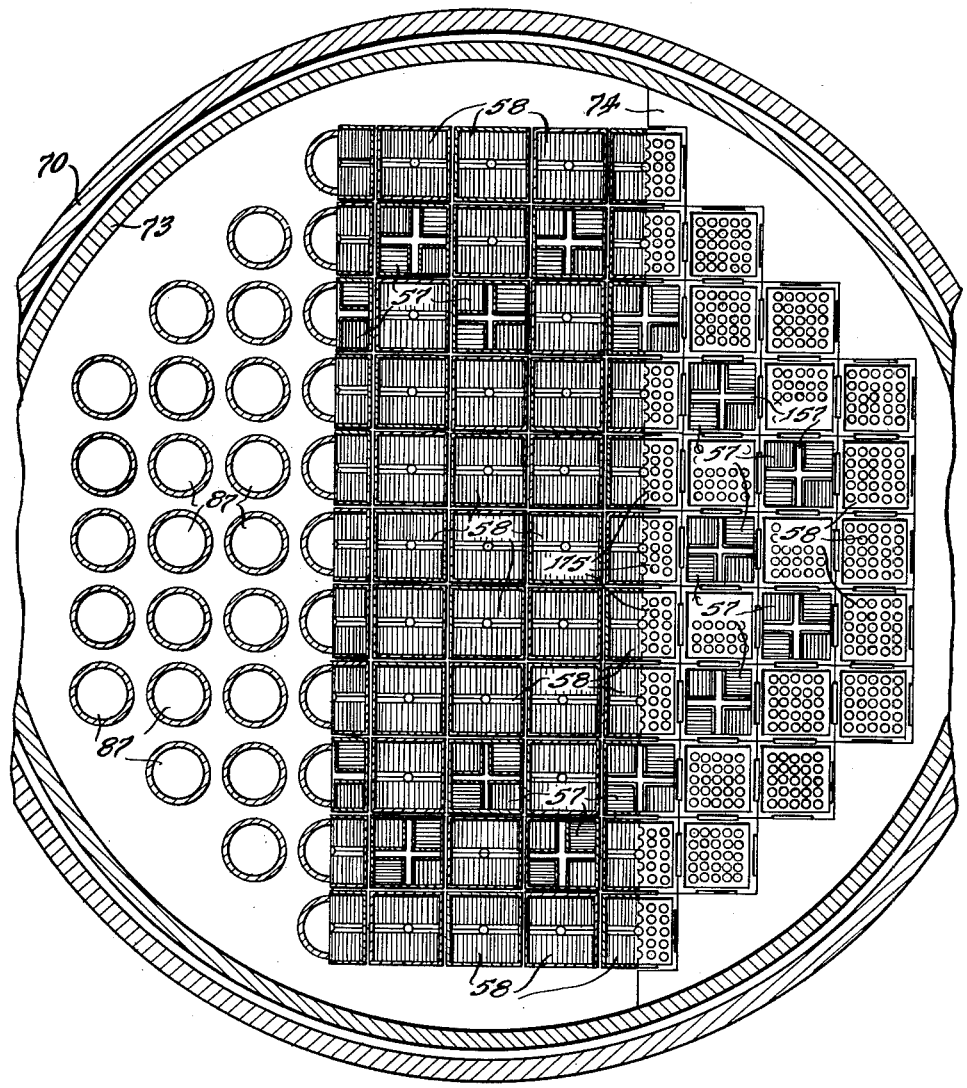
FIG. 2 is a horizontal sectional view taken on the three levels indicated by the line 2—2 of FIG. 1, with instrumentation being omitted for clarity.

As shown in FIGS. 1, 2 and 3, the reactor of the present invention comprises a pressure vessel 50, including a vessel shell 51 and a closure head 52, a core 53 contained in the vessel 50, an upper plenum chamber 54 in the top of the vessel, and a lower plenum chamber 55 in the bottom of the vessel. The pressure vessel is 32 feet in height and 9 feet in diameter. The core 53 contains fuel assemblies of two kinds—seed fuel assemblies 57, disposed generally in a ring, and identified by the cruciform channel therein, and blanket fuel assemblies 58 disposed within and around the ring of seed assemblies (see FIG. 2).

The core 53 is supported in pressure vessel 50 by core support structure 59. Core support structure 59 comprises a core cage assembly 60, an upper support barrel 61, and a core support flange 62.

Core support flange 62 is clamped between shell 51 and head 52 of pressure vessel 50 by bolts 63 extending through flanges 64 and 65 on the shell 51 and head 52, respectively. Core support flange 62 is provided with wear pads 66 on the top and bottom thereof and with keys mating with keyways (not shown) in the closure head and vessel shell. This flange 62 is 19 inches in thickness.

Core support flange 62 is welded to the top of upper support barrel 61. The upper section of upper support barrel 61 contains a large number of vertical coolant outlet slots 67, which are distributed circumferentially about the barrel 61 in spaced relation to one another and allow the support barrel 61 and flange 62 to expand differentially without generating high thermal stresses. A ring of circumferentially spaced holes 68 is provided below the slots 67 to increase the exit flow area. Two rings of circumferentially spaced holes 69 are provided in the lower portion of upper suppport barrel 61 to satisfy natural circulation requirements after loss-of-flow accidents and also to satisfy emergency coolant injection requirements after a loss-of-coolant accident. These holes are sized and located such that they direct streams of water at each seed assembly 57.

Upper support barrel 61 and core cage barrel 70, forming part of core cage assembly 60, are fastened together by bolts 71 extending through external flanges 72 and 72a formed, respectively, on the bottom of the upper support barrel 61 and the top of the core cage barrel 71. In addition to core cage barrel 70 the core cage assembly 60 includes an inner thermal shield 73, a lateral support ring 74, and a bottom support 75.

The core cage barrel 70 contains and supports the bottom support 75, the inner thermal shield 73, and the lateral support ring 74. The barrel 70 is a cylinder having two axially spaced rings of circumferentially spaced rows of holes 76 and 77 near each of the top and bottom of the cylinder, which holes allow coolant to flow into and out of the annulus between the core cage barrel 70 and the inner thermal shield 73. The bottom support 75 is secured to the lower end of the barrel 70 by pins 77a.

The inner thermal shield 73 is a cylinder located inside the core cage barrel 70. It is secured at the bottom by pins 78 to the bottom support 75 and is free at the top to expand relative to the core cage barrel 70. An external flange 79 is provided at the top of the inner thermal shield 73 to maintain the annular space between the shield and the core cage barrel 70 and carries in a groove 80 a sealing ring 81 which prevents excessive leakage of coolant between the core cage 70 and the inner thermal shield 73.

The lateral support ring 74 is machined to fit inside the core cage barrel 70 and is attached thereto by pins 82. The internal contour of the lateral support ring 74 is in the form of the periphery of the core 53. The primary function of the ring 74 is to provide lateral support for the fuel assemblies 57 and 58.

The bottom support 75 (see FIGS. 3 and 29) bears the weight of the fuel assemblies 57 and 58. It consists of an upper plate 83, a lower plate 84, a ring 85 welded to the outer edges of plates 83 and 84, stiffening ribs 86 extending between and welded to the plates 83 and 84 just within the ring 85, and a plurality of support tubes 87 individually shrunk into openings in upper and lower plates 83 and 84 and pinned to the lower plate 84 which serve as webs to make the bottom support 75 a composite structure. Support tubes 87 are arranged in the pattern of the fuel assemblies 57 and 58 which are to be supported thereby. The outer ring 85 is the component of the bottom support 75 to which the inner thermal shield 73 and core cage barrel 70 are secured. The stiffening ribs 86 are peripherally spaced from one another and extend radially inwardly from regions just within the ring 85 and have various widths or radial dimensions.

The support tubes 87 are shown in more detail in FIG. 29. They extend a considerable distance above the upper plate 83 of bottom support 75, and are slightly larger in diameter above this plate than below it. The inner diameter of the upper portion of the support tubes 87 is machined to accept the bottom of the fuel assemblies 57 and 58. A tapered lead-in 91 and keyways 92 are included to facilitate insertion and positioning of the fuel assemblies 57 and 58.

In addition to serving as a support for the fuel assemblies and as webs in the bottom support 75, the support tubes 87 contain a flow meter 93 consisting of a modified venturi 94. Taps 95 leading to the throat of the venturi 94 and taps 96 leading to the upstream side of the throat are drilled perpendicular to the sides of the support tubes 87. Mechanical fittings 97 are attached to each tap 95 and 96 and permanently fixed to the support tube.

Above the flow meter 93 is located a pick-up tap 98 for a sample of the coolant. Pick-up tap 98 consists of a pick-up tube 99 supported at the center of support tube 87 by a spider 100. A hole 101 is drilled through the web of the spider 100, and out the side of the support tube 87 to a mechanical fitting 102. The extension of the support tube 87 above the upper plate 83 of the bottom support 75 is to provide a calming section in the tube on the upstream side of the flow meter 93.

Holes 103 in the lower plate 84 of bottom support 75 provide an inlet for coolant into the bottom support. The support tubes 87 which are located about the periphery of the bottom support 75 have openings 104 therein communicating with the interior of the bottom support to provide an outlet for the coolant from the bottom support.

A cylindrical thermal shield of stainless steel 105 for the core 53 surrounds the core cage barrel 70 and is provided with an upper external flange 106 which rests upon a ledge 107 on the inside of the pressure vessel shell 51. Holes 108 near the top of the shield 105 provide flow channels through which coolant may pass.

Bolting flange 72a of core cage barrel 70 extends over flange 106 of shield 105. To prevent leakage of coolant at the upper ends of the barrel 70 and the shield 105 from the annular space between the shield and the barrel 70, a Belleville spring 109 is installed so that it is clamped by and between the thermal shield flange 106 and the core cage barrel flange 72a.

A flow baffle 110, consisting of a foraminous plate 111, swirl vanes 112, and flow deflectors 113, is formed as an integral bottom of the thermal shield 105. Swirl vanes 112 are slightly cup-shaped and tilted so that they direct water to the bottom of the pressure vessel 50. Flow deflectors 113 are triangular in shape and direct approximately 15% of the coolant flow past the thermal shield 105.

The pressure vessel 50 is provided with four inlet nozzles 114 uniformly spaced thereabout and communicating with the lower plenum chamber 55 and four outlet nozzles 115 uniformly spaced thereabout and communicating with the upper plenum chamber 54. The coolant flow is supplied by four pumps which circulate the coolant through the reactor vessel and through four separate loops, each of which contains a pump and a heat exchanger. The secondary coolant obtained from the heat exchangers is used to generate electricity as in conventional in the art. The arrangement of four separate loops each including a separate inlet nozzle and a separate outlet nozzle provides an even distribution of flow to the core and promotes mixing of coolant prior to entry to the core.

The closure head 52 has a dome section 116 having a flattened top portion 117 and a refueling port 118, which is closed by a head 119. The dome section 116 of the closure head 52 is a forging shaped essentially in the form of a truncated cone on the outside and a hemisphere on the inside. Twenty tubular housings 120 are secured in openings in the flat portion 117 of dome section 116 of the closure head 52 around the centrally located refueling port 118. The section of the dome containing the openings for the housings 120 is of sufficient thickness to provide the required hole reinforcement without the necessity of providing bosses.

The head 119, which closes the refueling port 118, is flat and circular, rests on a circular ledge 121 inside the port 118, and is held down by means of bolts 122.

FUEL ASSEMBLIES

The arrangement of the fuel assemblies 57 and 58 is shown in FIG. 2. Twenty seed fuel assemblies 57, which can be recognized by the crosses designating the control rods and channels therefor, are arranged corner to corner in a single annulus shaped like a square with the corners pushed inward. Control rods are only necessary in the seed, since it is only in these assemblies that the uranium-235 loading is high enough to exceed the fission rate required for criticality. There are 77 blanket fuel assemblies 58 occupying the space inside of and surrounding the seed annulus.

The fuel assemblies are positioned and supported within the core cage assembly 60. They engage the support tubes 87 of the bottom support 75 and are held down by the twenty control rod shrouds and a center support as will be described hereinafter.

A complete fuel assembly 57 or 58 is shown in FIG. 4. It contains a top extension bracket 123, a fuel cluster 124 or 124a, and a bottom extension bracket 125. The basic structure of all fuel assemblies is identical regardless of whether the fuel cluster 124 or 124a contains the natural uranium of a blanket fuel assembly 58 or the enriched uranium of a seed fuel assembly 57. Therefore the parts of each seed assembly 57 are completely interchangeable with those of each blanket assembly 58. In addition, the general design of the three components permits either top or bottom extension brackets to be fastened to either end of the fuel cluster. The ability to interchange fuel assemblies permits maximum utilization of fuel.

The fuel cluster 124 or 124a does little more than contain and support the fuel elements and direct coolant flow past them. They consist of plate type fuel elements arranged in a single welded unit. Spaces between plates are passages for coolant flow. The clusters are 7⅜ inches square with a ¼ inch gap between adjoining clusters.

The extension brackets 123 and 125 provide the mechanical requirements of the fuel assembly. The functions of the extension brackets include supporting the fuel assembly in the core 53, providing means for instrumenting, directing and regulating the coolant flow and providing means for handling the fuel assembly.

The top extension bracket 123 is shown in FIG. 5. It is essentially a thin-walled box 126 of the same size and shape as the outer walls of the fuel cluster 124 or 124a. Located in the bottom inside corners of the brackets are four bosses 127 through which the top extension bracket 123 is bolted to the fuel cluster. Extensions 128 of the bottom surfaces of the top bracket 123 at the bosses 127 project into the fuel cluster 124 or 124a to key and align the top extension bracket 123 to the fuel cluster. The bosses contain a bolt clearance hole and counterbore 129. In the region immediately above the bosses 127, the corners of the box 126 are removed as at 130 to permit installation of the bolts from the outside of the bracket. Cover plates 131 inside the box section 126 isolate the bolts from the assembly coolant flow. At the top of the bracket is a relatively thin-walled section 132 with a thicker section 133 located therebelow creating a ledge 134 upon which the restraining force from the control rod shrouds and center support is applied. The thin-walled section 132 contains four off-center slots 135 by which the fuel assembly may be handled by an extraction tool. On the outside corners of the thick-walled section 133 are bearing pads 136 which contact similar pads 136 on the fuel assemblies and thus limit the lateral motion of the fuel assemblies. Also present are four off-center apertures 137 in the thick-walled portion 133 of the box 126.

So far, the top extension brackets 123 for the seed fuel assemblies 57 and the blanket fuel assemblies 58 are identical. The top extension brackets 123 of the seed assemblies contain four inward projecting pins 138 in apertures 137. They are displaced from the center-lines so as not to interfere with control rod operation. The purpose of the pins 138 is to key the control rod shroud to the fuel assembly, thus aligning the control rod channel in the fuel assembly with the control rod channel in the shroud.

Figure 30:
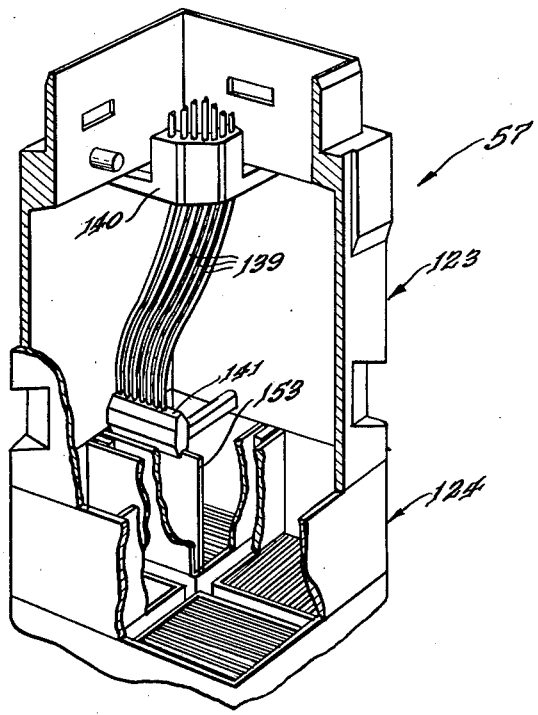
FIG. 30 is a perspective view, partly broken away, of an instrumented seed top extension bracket.

Six seed assemblies 57 contain fuel metal temperature thermocouples and therefore require additional modifications to the top extension bracket. These modifications are shown in FIG. 30. The top extension bracket is provided with seven thermocouple guide tubes 139, held in place by an upper support 140 and a lower support 141. The upper support holds the guide tubes 139 in the same pattern as the supports and guide tubes which are mounted in the control rod shrouds. The holes in the lower support 141 are positioned over the holes in the fuel plate in which the temperature is to be measured. The guide tubes 139 provide a gradual transition between the angular orientation of the upper support 140 and the in-line pattern over the fuel plate.

For the blanket assembly, a coolant sampling rake is added to the basic top extension bracket. This is shown in FIG. 13 and will be described in connection with that figure.

The bottom extension bracket as shown in FIG. 6 consists of a flow transition piece 142, a fuel assembly support cylinder 143, a fuel assembly support spring 144, a spring pad 145, a spring container 146, and an orifice support ring 147.

The flow transition piece 142 is a thick-walled member whose function is to provide a transition in flow cross-sectional area from the round area of the support cylinder to the square area of the fuel cluster, thus assuring uniform flow distribution to all coolant channels. The length over which the transition occurs is as long as practicable in order to improve the flow distribution and reduce loss in pressure head. In the corners of the top of the transition piece 142 are bolt holes 148 through which the bottom extension bracket is bolted to the fuel cluster. Keying extensions 149 protrude from the corners of the transition piece 142 and key and align the bottom extension bracket 125 to the fuel cluster 124 or 124a as the extensions 128 did for the top extension bracket 123.

From the bottom of the transition piece 142 extends the circular fuel assembly support cylinder 143. Two Stellite wear rings 150 and 151 are attached to the outside of the cylinder. Wear ring 150 is located at the bottom of the cylinder and is chamfered to facilitate insertion of the cylinder into the support tube 87 (FIG. 29). The second wear ring 151 is located just below the spring container 146. Fastened inside the fuel assembly support cylinder 143 below the transition region is the orifice support ring 147 that is used for the blanket orificing. This ring will be explained hereinafter. Surrounding the cylinder 143 and bearing against the lower surface of the transition piece 142 is the fuel assembly support spring 144. Enclosing the support spring 144 and a portion of the transition piece 142 is the spring container 146. Connected to the bottom of the spring container is the spring pad 145, whose inner diameter contains two Stellite piston rings 152 which bear on the outside surface of the support cylinder to seal against leakage flow. When the reactor is assembled, the weight and the restraining load of the fuel assembly is transmitted to the bottom support through the fuel assembly support spring and pad which takes up manufacturing tolerances and relative motion due to thermal expansion. This pad, resting on the top surface of the support tube, provides a seal against leakage at this location.

Modifications to the bottom extension bracket required when it is used with a blanket fuel assembly will be described in connection with FIG. 13.

A seed fuel cluster 124 is shown in FIG. 7. The particular cluster shown includes an instrumented fuel plate 153, shown in FIGS. 11 and 12. It is two ordinary fuel plates thick and contains two fuel portions 153a, which are formed of an alloy of zirconium and highly enriched uranium, are 0.0135 inch thick, and are spaced 0.126 inch from one another. The instrumented plate 153 also contains seven wells 154 which lie between the fuel portions 153a and extend from the top of the plate to a point within the plate and slant at an angle to the vertical. All of these wells are arranged in a single vertical plane and the angle of slant and depth of each well is such that the bottom of each well is directly below the one above it. Thermocouples 155 are shown in place in the bottom of the wells 154 to obtain the centerline temperature of the selected fuel plate. From this temperature distribution, the axial thermal neutron flux and power distribution can be obtained. Also the surface temperature of the fuel element can be computed.

The seed fuel cluster 124 consists of a Zircalloy-2 weldment of four alloy fuel plate subassemblies 156, welded together to form a cruciform control rod channel 157. As shown in FIG. 8, each fuel plate 158 has enlarged side edges 159 and 160. In preparing the fuel plate subassemblies 156, these fuel plates 158, together with two Zircalloy-2 end plates 161 and 162, are welded together. The end plates 161 form parts of the outer walls of the cluster 124, and the end plates 162 are interior to the cluster 124 and form part of the control rod channel 157. These subassemblies 156 are welded together with spacers 163 to form the control rod channel 157. The cluster 124 has two square tubular end parts 164 and 165, which are welded to the ends of the fuel plate subassemblies 156. Within the end parts 164 and 165 the control rod channel 157 is defined by extensions 166 of the four interior end plates 162 and by extension plates 167 attached to the enlarged side edges 160 of the fuel plates 158 interior to the cluster 124. As is evident from FIG. 7, cluster end parts 164 and 165 contain bosses 168 to which the top and bottom extension brackets 123 and 125 are bolted. The bottom cluster end part 165 carries an orifice member 169 in the control rod channel 157. This orifice member is a Zircalloy plug with a series of holes 170 drilled therein to permit a sufficient amount of coolant flow to enter this channel 157 to cool the control rods.

Each seed subassembly 156 contains 24 fuel plates. The arrangement of the subassemblies is such that the orientation of fuel plates in diagonally opposite subassemblies is the same; however, the fuel plates in adjacent subassemblies are perpendicular to each other. The reasons for orienting the subassemblies in this manner are both to insure that the fuel cluster will have equal rigidity about both of its principal axes and to permit uniform zone loading of the cluster.

The arrangement of fuel plates in a seed subassembly is shown in FIG. 8. The six fuel plates 158a nearest the control rod channel 157 may have a reduced fuel concentration to optimize thermal performance of the reactor while the seventh plate 158b from each end is a poison plate containing a burnable poison in a rectangular area 172 at each side of the central fuel area. The remaining fuel plates 158c contain the normal concentration of fuel. By zone loading the seed in this manner a power peaking factor reduction in excess of 16% over a uniformly loaded seed may be obtained.

A typical fuel plate 158a or c is shown in FIG. 9. It is conventional in character, consisting of an alloy of zirconium and highly enriched uranium as the fuel portion 173 thereof and a cladding 174 of Zircalloy-2. The concentration of the uranium is determined by the desired power and seed lifetime. The only difference in plates 158a from plates 158c is that they may have a lower concentration of fuel therein. The thickness of each plate 158c is 0.059 inch; the fuel thickness is 0.027 inch; the clad thickness is 0.016 inch; and the plates are located 0.67 inch apart to provide a coolant channel therebetween.

A typical poison plate is shown in FIG. 10. It consists of a fuel portion 173, cladding 174 and two areas 172 in which a burnable poison is distributed. The burnable poison is a boron-10-stainless steel alloy with the boron being uniformly distributed therein in the form of 1 to 5 micron particles. A thin barrier of niobium is employed to separate the burnable poison from the fuel. In the alternative the boron may be incorporated in a burnable poison matrix as a powder dispersion of $Fe_2B^{10}$ particles of controlled size and distribution. As a third alternative $B_4^{10}C$ pellets or wafers may form compartments in the burnable poison matrix.

Burnable poison is located in two of the 24 fuel plates 158 of each seed subassembly 156 and the core 53 contains a total of approximately 800 grams of boron-10.

A complete blanket fuel assembly 58 and associated instrumentation is shown in FIGS. 13–19. The blanket fuel assembly 58 includes a top extension bracket 123, a fuel cluster 124a, and a bottom extension bracket 125 which are identical in basic form to these elements in the seed assemblies 57.

As has already been stated, the only modification required in the basic top extension bracket 123 to use it in the blanket fuel assemblies 58 is to incorporate a coolant sampling rake 175 therein. This is pinned in place by pins 176 which occupy the same holes that pins 138 occupy in the seed fuel assemblies 57. Coolant sampling rake 175 comprises a stainless steel box 177 mounted in the top extension bracket so that it covers the complete cross-sectional flow area. Its function is to gather a representative sample of coolant from the fuel assembly flow stream. Circular tubes 178 pass through the rake 175 to permit the bulk of the coolant flow to pass through the rake. The upstream side 179 of the rake 175 is perforated with many small holes 180 (see FIG. 14) through which a sample of the coolant is removed and flows into the interior of the rake. A tube 181 located in the center and perpendicular to the sides of the rake 175 extends down through the fuel assembly 58. This tube 181 communicates with the interior of the rake by means of openings 182 in a Stellite bushing 183 and openings in the tube 181 registering with openings 182. It is through tube 181 that the sample is removed from the rake. The Stellite bushing 183, which is mounted in the rake, supports the sampling tube 181 and provides a seal to limit leakage into the rake. The sampling tube 181 may be manipulated by a tool, not shown, connectible with bayonet slots 184 in the upper end of the sampling tube.

The sample passes through the tube 181 through the center of the fuel assembly and bottom extension bracket 125. As shown in FIG. 29, the sample is transferred from the sampling tube 181 to the pick-up tap 98 by means of a sphere-in-cone type of seal 185 made with a compression spring 186 carried within a spring housing 186a (see FIG. 19) in the bottom extension bracket 125. The spring load is applied to the sampling tube through a flange 187 on the tube 181 in the region of the variable orifice.

Each blanket cluster 124a contains two rectangular subassemblies 188 welded together to form a square structure and two cluster extensions 189 and 190 welded to the ends of this structure. Each fuel subassembly 188 has a groove 191 machined into one side wall and extending the full length of the subassembly. When two subassemblies 188 are joined together, the grooves 191 register with one another and form a small opening 192 through the center of the cluster 124a, through which opening the coolant sampling tube 181 extends.

Each subassembly 188 contains five central plates 193a, 18 standard plates 193b, and 10 modified plates 193c. Each of plates 193a, 193b, and 193c has enlarged side edges 194 and 194a, which are welded together and to end plates 195 to form the two subassemblies 188 and to join the latter to one another to form the fuel cluster 124a. As shown in FIGS. 16 and 17, plates 193 are composed of uranium dioxide fuel wafers 196 situated in compartments 197 formed by structural ribs 198 to which the cladding 199 is bonded. These blanket fuel plates embody the inexpensive, corrosion-resistant, irradiation-damage-resistant, $UO_2$ fuel and the favorable heat transfer characteristics of plates. As shown, ribs 198 are in a rectangular lattice in which the length of the compartments formed by the lattice is much greater than the width. These compartments and the wafers contained therein are of different sizes depending on their location in the blanket subassembly.

All plates contain 88 individual compartments 197 arranged in eight rows of eleven each. One row of compartments 200 at one end of the fuel plates is of shorter length than the rest of the compartment rows. In assembling the subassembly 188 alternate plates 193a, b and c are inverted so that the horizontal ribs 198 of two adjoining plates are not situated at the same level. The reason for this is to minimize the restrictions which occur in a water channel due to possible protrusions of the horizontal receptacle ribs above the normal heat transfer surface of the plate which would restrict the width of the coolant channel between the plates. This possible protrusion is the result of tolerance accumulations which occur during fabrication of the plates.

As has been stated, three different kinds of blanket plates have been employed. The standard plate 193b has a nominal thickness of 0.138 inch including a fuel thickness of 0.100 inch. Modified plates 193c have a nominal thickness of 0.124 inch including a fuel thickness of 0.086 inch. By this means a reduction of 8% in the local power peaking factor over a uniformly loaded blanket is obtained. The center plates 193a have the same thickness as the standard plates 193b but a shorter span to provide the opening 192 at the center of the assembly. The rib thickness is 0.102 inch and the plates are 0.076 inch apart to provide a coolant channel therebetween.

Each of plates 193a, 193b, and 193c is 91 inches in length, with plates 193b and 193c being 3.658 inches in width, while plate 193a is narrower to allow for opening 192. The normal length for a compartment is 12.229 inches while the short compartment 200 is 3.494 inches in length. The width of a compartment in plates 193c and 193a is .246 inch and in plates 193b is .266 inch.

The fuel wafer is a refractory, nonmetallic unit of natural $UO_2$ having a minimum density of 96% of theoretical. The length of each wafer is approximately 1½ inches; therefore, two wafers are present in the shortened compartment 200 while seven are present in the normal length compartment 197.

Figure 31:
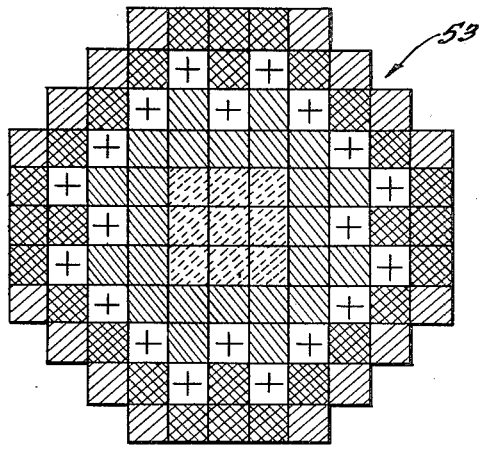
FIG. 31 is a schematic horizontal sectional view of the reactor showing the blanket regions.

As shown in FIG. 31, the blanket fuel assemblies 58 are divided into four regions according to their position relative to the seed. The thermal neutron flux distribution is uneven in the blanket with the highest neutron flux occurring in the blanket regions nearest the seed and decreasing with distance from the seed. To obtain optimum power the coolant flow through each of these four regions must differ with the highest flow passing through the assemblies exposed to the highest flux. The variable orifice devices, which are located in each blanket fuel assembly 58 as will next be described, are employed to establish the amount of flow through each of the regions of the blanket. By establishing four regions of orificing, 95% of the core power which could theoretically be obtained by establishing a larger number of regions of orificing is attained.

In the lower extension bracket 125 of the blanket assemblies 58 is located a variable orifice device 205. Since the average power density in the seed is larger than in the blanket, approximately 50 watts/cc. and 17 watts/cc., respectively, the minimum flow required to cool a seed assembly 57 is larger than for a blanket assembly 58 even though the heat transfer area per seed assembly is larger than for a blanket assembly. In order to reduce the limited flow available, the blanket flow is reduced accordingly. The variable orifice device makes it possible to vary the flow through the blanket assemblies without disassembling the reactor.

The variable orifice device 205 is mounted on sampling tube 181 and operated thereby. It consists of an odd number, for example, three, of spaced annular plates 206a having arcuate orifices 207 therein, the spring housing 186a depending from the lowermost plate 206a, an outer cylindrical wall 208 joining the outer edges of the plates 206a, an even number, for example, two, of spaced annular plates 206b having orifices 207 and alternating with the plates 206a, an inner tubular hub 209 joining the inner edges of the plates 206b and being mounted on the sampling tube 181, two sets of key slots 210 located 180° apart formed at an internal corner between the wall 208 and the upper orifice plate 206a, two keys 211 located 180° apart on the periphery of the adjacent orifice plate 206b which are engageable with the key slots 210, the spring 186 bearing on flange 187 which functions to urge the key 211 into engagement with one of the key slots 210, four through vertical grooves 212 spaced 90° from one another on the interior of hub 209, four blind vertical grooves 213 spaced 90° from one another and 45° from the through grooves 212 on the interior of hub 209, and four projections 214 spaced 90° from one another on the sampling tube 181. The orifice device 205 is supported in the bottom extension bracket 125 below the flow transition piece 142 by a support tube 215 and integral spider 216, an orifice support ring 147 and a wave washer 218. The spider 216 is located near the top of the extension bracket 58 and is held in place at the joint between the bracket 58 and blanket fuel cluster 124. The support tube 215 extends from the center of the spider 216 and holds the bottom surface of the orifice unit against the compressed wave washer 218 on the orifice support ring 147 secured in the fuel assembly support cylinder 143. Tolerance build-up between the orifice device 205 and bottom extension bracket 125 is taken up by wave washer 218.

The orifice plates 206b are rotated relative to the fuel assembly 188 while the orifice plates 206a are permanently fixed with relationship to the fuel assemblies. In order to change the pressure drop of the variable orifice device 205, the two movable plates 206b are relocated with respect to the stationary plates 206a. This changes the position of the orifices 207 in plates 206a with relationship to those in the plates 206b. The minimum pressure drop occurs when the orifices 207 in the movable plates 206b are in complete registration with the orifices in the stationary plates 206a, and the pressure drop increases with decrease in registration of the orifices of the movable plates with those of the stationary plates. The required degree of registration of the orifices in the plates is predetermined. The orifices 207 are arcuate in shape so that changes in the degree of registration of the orifices give a linear variation in the pressure of the coolant flow therethrough.

In order to vary the registration of the orifices 207 without removing the blanket elements 58 from the reactor, the bayonet slots 184 at the top end of the sampling tube 181 are engaged by a tool. The sampling tube 181 is then lifted by the tool, thereby compressing the orifice spring 186 and moving the projections 214 axially beyond, and thus out of engagement with, the through slots 212. The sampling tube 181 is then rotated by means of the tool till the projections 214 are aligned with the blind slots 213. The sampling tube is then lowered while the projections 214 engage the blind slots 213. A downward force is then applied to the sampling tube 181 moving the hub 209 and the orifice plates 206b which are attached thereto. This disengages the keys 211 from the key slots 210 in the stationary plate 206a making it possible to rotate the sampling tube 181, hub 209, and movable plates 206b to the desired angular position. The downward force is then removed and the orifice spring 186 urges the movable plates 206b upward engaging the keys 211 in new key slots 210. The sampling tube 181 is then lifted, rotated till the projections 214 are aligned with the through grooves 212 and released, whereupon the spring 186 lowers the sampling tube and seats it in the pick-up tap 98 to form the sphere-in-cone seal 185 and returns the projections 214 to the lower portions of the through grooves 212.

REACTIVITY CONTROL SYSTEM

The power level of the reactor is controlled by 20 cruciform control rods 219 (shown in FIGS. 20 and 24) which operate in similarly shaped channels 157 provided in each of the seed fuel assemblies 57. The control rods 219 are formed of hafnium and each one is 94 inches long with a 5¼-inch span and a .226-inch thickness. The total reactivity worth of all rods is 15.1%. Near the lower end of the rod, rubbing shoes 220 are provided to minimize the contact surface between the blades of the rod and the walls of the control rod channel 157. The shoes reduce the friction loads during operation and assure that coolant flow is provided on all faces of the control rod should the rod be displaced to one side or distorted by uneven temperature distribution. The control rod 219 is joined to a control rod shaft assembly 221 by an adapter 222. Adapter 222 is joined to shafting assembly 221 by a bayonet type connection 223. As shown in FIG. 20, the control rods 219 are operated by operating mechanisms 224 mounted on the pressure vessel closure head 52 vertically above, and in line with, the control rods. The control rods 219 are connected to the mechanisms 224 by the control rod shafting assembly 221. Since the operation mechanism 224 is conventional it will not be further described.

As shown in FIGS. 21, 23, and 24, control rod shafting assembly 221 consists of a tie rod 225, a control rod shaft 226 having a lower noncircular portion 227 of small diameter and an upper circular portion 228 of greater diameter forming thereby a buffer piston 229, and a lead screw 230. More particularly, the noncircular lower portion 227 of shaft 226 is characterized by two opposed parallel flat sides and two opposed arcuate sides on the same center. Tie rod 225 connects the shafting assembly 221 to the control rod adapter 222. It passes through the lead screw 230 and the control rod shaft 226 and can be operated from outside the pressure vessel. Operation from outside the pressure vessel is required to disconnect the shafting assembly 221 from the control rod 219 to permit raising of the shafting assembly during refueling and removing of the control rod 219 from the core. The tie rod 225 is designed to move inside the lead screw 230 and the control rod shaft 226. It can be positioned axially and rotated to perform the connecting and disconnecting operation. The tie rod 225 serves as the primary energy absorbing component of the control rod shafting assembly 221.

At the lower end of the tie rod 225 is a male portion 231 of the bayonet type connection 223 between the tie rod 225 and the control rod adapter 222. The tie rod 225 has lugs 232 thereon whose upper surfaces form a ledge 233 which mates with ledge 234 formed by recess 235 in the control rod adapter 222 which forms the female portion 236 of the connection 223. Below the ledges a pin 237 on the tie rod 225 is guided by a J-slot 238 in the control rod adapter 222 to insure proper alignment of the mating ledges 233 and 234 during the connecting operation. Channels 234a in the ledge 234 are provided for protuberances 232 to pass through when making or breaking the connection. These are shown in FIG. 25.

The hollow control rod shaft 226 provides the connection between the lead screw 230 and the control rod 219. The upper portion 228 of the shaft 226 is 2 inches in diameter and the lower portion 227 is 1⅛ inches in diameter. The transition between lower portion 227 and upper portion 228 serves as the buffer piston 229 during scram.

The lead screw 230 is a long externally threaded tube which extends along the centerline of the control rod drive mechanism 224. It has external threads 239 which are threaded into internal threads 240 in control rod shaft 226 to which it is secured by a cup washer 241.

As shown in FIGS. 1, 20, 21, 23, and 24, each control rod 219 and shafting assembly 221 is surrounded in the upper plenum chamber 54 by a control rod shroud 242 which has a constant outside diameter of 5⅞ inches along its entire length. This not only shields the control rod and shafting assembly from hydraulic forces due to coolant cross-flow and supports the shaft bearings, buffer and instrumentation leads but also holds the fuel assemblies in place. This forms an important part of the invention which will be described in detail hereinafter.

As seen in FIG. 28, the assemblies 57 and 58 are held in place by module frames 243a, 243b, and 243c. As seen in FIGS. 24, 25, and 26, module frames 243a and 243b are each secured to the lower end of a control rod shroud 242 and four control rod scabbards 244 including internal flanges 244a are secured within each shroud 242.

Module frame 243c will be described hereinafter. As shown in FIGS. 21 and 25, each control rod shroud 242 comprises upper, middle and lower tubular sections 245, 246, and 247 and a buffer 248. The module frame 243a or 243b is welded to the lower section 247 of the shroud 242, as shown in FIGS. 24 and 26. The control rod 219 never comes above the top of lower section 247 of the shroud 242.

The shroud 242 contains instrumentation guide tubes 250 and the upper section 245 thereof contains the lower end of a mechanism housing 249, which is threaded into shroud support flange member 251, which in turn is threaded into upper section 245 of the shroud 242 and pinned therein by pin 253. Flange 252 rests on ledge 254 in housing 120.

At the lower end of mechanism housing 249 is a lead screw bushing 255 immediately surrounding the lead screw 230 while immediately thereabove is an instrumentation shield tube 256 containing instrumentation holes 257. The function of shield tube 256 is to protect the thermocouples passing through the mechanism housing 249 from damage that could be caused by the lead screw 230.

To guide and support instrumentation guide tubes 250, a support plate 258 is pinned to the upper shroud section 245 by pins 259 just below mechanism housing 249. The control rod shroud 242 is clamped in the closure head 52 by a ring 260, which is threaded into the housing 120 to tighten the flange member 251 against the ledge 254 in the housing 120. Lock washer 261 prevents rotation of the ring 260 and a closure ring 262 on top of the lock washer 261 is threaded into and welded to the housing 120 to prevent leakage of coolant therefrom.

Tapered bearing 263 forms a part of a block 264 which connects upper section 245 and middle section 246 of the shroud 242. The connection is made by threads 265 and pins 266. The block 264 includes flow apertures 267 for coolant and instrumentation apertures 268 through which instrumentation guide tubes 250 are led.

Because each of the module frames 243a, 243b, and 243c is larger than the inside diameter of the housing 120 in the closure head 52, the shroud 242 is made in the three separate sections 245, 246, and 247 so that the sections 245 and 246 may be disconnected from the section 247 and removed through the housing 120, and the section 247 and module frame 243a or 243b, being permanently joined to one another, are removed through the central refueling port 118, which is of relatively large diameter.

For removal of the shroud tube and module frame separation is made by shroud disconnect assembly 269 which includes buffer block 270 containing a buffer cylinder 271 which cooperates with buffer piston 229 to serve as the control rod buffer 248.

Impact surface 272 of the control rod shaft 226 is a conical surface with a 120° included angle. The impact surface 273 in the buffer block 270 has a curved face whose chord is inclined to mate with the conical surface of the shaft. This design decreases the possibility of point contact between the two surfaces which would result in excessive strains at the point of impact. The buffer action takes place at the last 12 inches of total control rod travel. Therefore, 86.5% of "free fall" scram is provided prior to slowing down by the buffer.

Advantages of locating the buffer in the shroud are the following:

(1) Operating conditions have little or no effect on the buffer performance. It is not necessary to have the pressure vessel completely full and at some minimum pressure for the buffer to be operative.

(2) The mechanism design is simplified.

(3) The drag on the control rod shafting is decreased during scram by eliminating close clearances during the full travel of the shafting.

Since the buffer is a hydraulic damper, it is necessary that it be submerged in water to be operative. The minimum water level is 84 inches above the outlet nozzles 115 of the pressure vessel.

In addition to the buffer block 270 the shroud disconnect assembly 269 includes a torque restraint bearing 274 and bearing retainer 275, a shroud locking sleeve 276 and locking sleeve retainer ring 277, and a shroud adapter 278 having functions which are obvious from their names. The bearing 274 has the same noncircular shape as the lower portion 227 of the control rod shaft 226, so that the shaft 226 cannot rotate with respect to the assembly 269. Also buffer blocks 270 and lower shroud adapter 278 have coolant flow apertures 279 and instrumentation apertures 279a therein.

To remove the shroud 242 from the pressure vessel, the shroud is lifted as high as it can be lifted, then it is disconnected at the disconnect assembly 269, the upper and middle portions 245 and 246 are removed through the penetration housing 120 and the lower portion 247 of the shroud 242 and the module frame 243a or 243b are removed through the central refueling port 118.

Secured to the inside of the lower shroud tube 247 are the four scabbards 244 or flow baffles which form the control rod channel in the shroud. Scabbards 244 in cross section are roughly a flattened semicircle with internal flanges 244a which are welded to the lower tubular section 247 of the shroud 242. These scabbards act as a shield to protect the control rod from hydraulic forces due to cross-flow in the upper plenum chamber. The shrouds have openings 279b therein in all three portions thereof to permit flow of coolant from the shroud.

FUEL ASSEMBLY SUPPORT SYSTEM

In order to simplify the construction of the reactor, components already present in the reactor are used to hold the fuel assemblies 57 and 58 in place. These components are the control rod shrouds 242. In addition to the shrouds one additional support member, center support 280, is employed. In this system of support the fuel assembly bottom extension bracket 125 engages support tube 87 in the bottom support 75, making the fuel assemblies free standing members. Depth of engagement is 6 inches. At the top of the fuel assemblies lateral clearance is limited by the lateral support ring 74 which fills the void between the inside of the core cage barrel 70 and the outer periphery of the fuel assemblies. Hydraulic and mechanical loads acting on the fuel assemblies are transferred to the shrouds 242 and center support 280 through the module frames 243a, 243b, and 243c. The module frames are all welded in construction and fabricated from stainless steel plates. Bearing pads 281 are machined on the bottoms of the module frames 243 so as to minimize the effect of the fuel assembly loading on the supports. Loads are transferred from the fuel assembly to the shroud by means of ledge 134 on top extension bracket 123. There are three types of module frames required to secure all fuel assemblies in the core—side module frames 243a shown in FIGS. 24 and 25, corner module frames 243b shown in FIG. 26 and center module frame 243c shown in FIG. 27.

As shown in FIG. 29 the core cross-section is divided into repeating patterns or groupings of fuel assemblies for the purpose of support. All but one of the groupings, the center group, contain one seed assembly 57 and either three or five blanket assemblies 58, depending upon the location of the seed assembly in the core. A single in-line support pattern is established for 16 of the 20 seed locations. This pattern includes a seed assembly 57 with two blanket assemblies 58 on one side and one blanket assembly on the opposite side. The four remaining seed locations not covered in the in-line groupings are at the locations in the core where the in-line groupings change direction. Here the seed assembly 57 is located in the corner of an angular arrangement that contains six assemblies. The module frames associated with the in-line and angular groupings are called the side module frame 243a and corner module frame 243b, respectively.

The analysis of the shroud support patterns indicated that it is impractical to hold down the center part of the core with the control rod shrouds 242. The center nine blanket assemblies 58 are so far removed from the nearest seed assemblies 57 that very large shrouds would be required to restrain the unbalanced loading produced. For this reason, a support member, the center support 280 shown in FIG. 1, is extended from the central refueling port hold 119 to secure the nine central blanket assemblies. The module frame welded to this support is called the center module frame 243c.

As shown in FIGS. 24 and 25, each of the side module frames 243a comprise two parallel side plates 282 and three parallel uniformly spaced cross plates 283 at right angles to the side plates forming two square openings 284 through the frame. There are short extensions 285 to the side plates 282 beyond the cross plates 283. This frame 243a is welded to shroud 242 by lugs 286 so that the shroud is centered in one of the square openings 284 in the frame. Location of the bearing pads 281 so that they will bear on one seed assembly 57 and three blanket assemblies 58 is shown in FIG. 25. Coaxial with and having the same radius as the shroud 242 is a shroud alignment ring 287 which has four shroud aligning slots 288 therein displaced from the centerline. These slots receive pins 138 in the upper bracket 123 (FIG. 5) to key the control rod shroud 242 to the seed assembly 57, thus orienting the control rod channel 157 in the seed assembly 57 with the channel formed by the scabbards 244 in the shroud 242. Shroud alignment ring 287 is secured to the scabbards 244.

As shown in FIG. 26, corner module frame 243b comprises two outer side plates 289 and 290 which join at right angles, two inner side plates 291 and 292 which also join at right angles and are parallel to the outer side plates 289 and 290, respectively, and four cross plates 293 of which two are parallel to plates 289 and 291 and two are parallel to plates 290 and 292 thereby forming three square openings 294 in the frame. Side plates 289, 290, 291 and 292 each have a short extension 295 which extends beyond the cross plates 293. A shroud alignment ring 287 having shroud aligning slots 288 is provided as in the side module frames 243a.

As shown in FIG. 27, the center module frame 243c comprises two pairs of parallel plates 296, the plates of one pair being at right angles to those of the other pair to form a square opening 297 therein. Each plate 296 has two short extensions 298 beyond the other two plates 296 that extend at right angles thereto. The module frame 243c is not connected to a shroud 242 and therefore does not include a shroud aligning ring. It is instead welded to center support 280 by lugs 299.

As shown in FIG. 1, slots 299a are provided along the length of support 280 to permit exit of coolant water from the center blanket assembly over which it is positioned and to prevent vibration due to cross flow in the upper plenum of the core. The center support 280 is secured at its top to the central refueling port closure 119.

The arrangement of bottom support 75, fuel assemblies 57 and 58 and control rod shrouds 242 makes possible individual handling of damaged or spent fuel assemblies without disturbing the remaining assemblies. It also allows rearrangement of assemblies during core life in order to obtain even burnup of the fuel in the core. The variable orifice device 205 makes this possible. The variable orifice device 205 also makes it possible to redistribute coolant flow during the life of the core without disassembling the core to take advantage of the power shift from the seed fuel assemblies 57 to the blanket fuel assemblies 58 which occurs as the seed becomes depleted and plutonium is produced in the blanket.

INSTRUMENTATION

With the use of the core support flange 62, the core 53 can be very extensively instrumented. Removal of the bulk of the instrumentation leads through the core support flange 62 allows a simpler closure head design and permits simpler refueling procedures, because it is not required to disconnect most of the instrumentation leads when the head is removed. The use of a flange also eliminates the necessity to mount a superstructure for instrumentation on the reactor head.

Instrumentation is provided to determine the following:
(a) The flow through and the exit temperature of each fuel assembly 57 and 58.
(b) The inlet temperature to 21 representative fuel assemblies 57 and 58. Good mixing of coolant prior to entry to the core precludes the necessity of measuring the inlet coolant temperature of each fuel assembly.
(c) Fuel metal centerline temperature of six selected fuel assemblies 57.
(d) Pressure differential across three selected blanket fuel assemblies 58.
(e) The temperature of the core cage barrel 70 at 18 selected locations.
(f) The temperature of the inner thermal shield 73 at 27 selected locations.
(g) The temperature of the bottom support 75 at five selected locations.
(h) Fuel element detection and location system for each of the 97 fuel assemblies 57 and 58. Facilities for detecting failed elements or lower integrity than that provided in the seed region are provided in the structural components because of the possibility of future use of a different seed. Only the blanket fuel assemblies 58 are monitored to detect and locate failed elements in the reactor core described herein.

The core support flange 62 is used to carry instrumentation leads for the flow measurement devices, the failed element detection and location system, and the inlet water thermocouples. This is referred to as support flange instrumentation. The remaining instrumentation is referred to as shroud instrumentation and includes exit water and seed metal temperatures and core differential pressure instrumentation.

The flow measuring device has already been described in connection with support tubes 87. As shown in FIG. 3, tubes 300 which connect to the fittings 97 (FIG. 29) are grouped and enclosed in a conduit 301 which physically protects the tubes during core assembly and refueling. The conduit 301 is routed over the bottom support 75 being held in place by supports 302. It is then routed up the inside surface of the inner thermal shield 73 and through the lateral support ring 74 and eventually to the support flange 62, as shown in FIG. 1. There are eight penetrations in the flange 62 for the 194 flow measurement tubes.

Since the tubing conduit 301 is subject to the effects of heat generation, a cooling system (not shown) may be included in the conduit. It would consist of a ¼ inch tube fixed to the end of the conduit that extends down through both plates of the bottom support and picks up inlet cooling water.

The failed element detection and location system (FEDAL) provides facilities to sample the coolant of each fuel assembly and pipe the sample to monitoring stations outside the reactor in order to detect and locate fuel assemblies containing failed fuel elements. As has already been stated, a pick-up tap 98 is located in each support tube 87 and an individual piping system connects each tap with a multi-port valve located outside the reactor vessel. The piping system comprises tubing that is attached to fitting 102 of pick-up tap 98. This tubing

*Table II*—Continued

MECHANICAL CHARACTERISTICS

[Used as a basis for thermal performance]

|  | Blanket | Seed |
|---|---|---|
| Active length, in | 89.72 | 90 |
| Number of plates, total | 5,082 | 1,920 |
| Number of assemblies | 77 | 20 |
| Channel width, in | 3.56 | 3.15 |
| Fuel width, in | 2.85 | 2.95 |
| Compartment width, in | 0.266 |  |
| Compartment length, in | 12.23 |  |
| Channel thickness, in | 0.076 | 0.067 |
| Fuel thickness, in | 0.100 | 0.027 |
| Plate thickness, in | 0.138 | 0.059 |
| Total flow area, ft.$^2$ | 9.45 | 2.93 |
| Equivalent hydraulic diameter, ft | 0.0124 | 0.0109 |
| Total heat transfer surface area, ft.$^2$ | 16,680 | 6,740 |

Table II describes behavior of the reactor with no re-orificing during the life of the core. Further power gains can be made by re-orificing at specific times during the life of the core. For one re-orificing at 5000 e.f.p.h., an increase of 8 mw. over the first 5000 hours and 4 mw. over the last 5000 hours may be obtained. A further gain is obtained by an additional re-orificing at 8000 hours whereupon 2 mw. are gained from 5000 hours to 8000 hours and 4 mw. are gained from 8000 hours to 10,000 hours.

At various times during the life of the core it will be necessary to refuel or exchange individual fuel assemblies through the central port 118 of the pressure vessel head 52. These changes may occur when replacing a complete seed, removing individual assemblies for observation, removal of damaged assemblies, and, possibly, replacement of all assemblies.

A dry refueling system is the preferred method for refueling. Following reactor shutdown and the cooling-off period required, the reactor pit is drained, necessary seals are cut and the head 119 removed. A transfer cask forming no part of the present invention is then installed in the pressure vessel head 52. After removal of the center support 280 from the vessel into its shielded transfer cask it is taken to storage to a fuel handling canal. Tie rods 225 are disconnected from control rods 219 in those mechanism-shroud-module frame assemblies which must be elevated during the refueling operation. The mechanism-shroud-module frame assembly is then raised to the extent of travel allowed before the module frames interfere with the bottom surface of the vessel head 52.

The fuel assembly transfer cask and extraction tool are then positioned on the central refueling port 118. The extraction tool, attached to a crane, is lowered into the vessel through the transfer cask and the selected assembly is picked up, translated to the refueling port 118 and withdrawn into the shielded transfer cask. The transfer cask is transported to the fuel storage area where the fuel assembly is lowered out of the cask. The transfer cask is returned and installed on the refueling port. A new fuel assembly is installed in the cask and lowered into the vessel into the vacant location in the core. Mechanism-shroud-module frame assemblies are returned as soon as all assemblies in the module have been exchanged.

Following installation of the final new fuel assembly, the transfer cask is removed from the vessel. Using the module frame shielding cask, the center support is replaced in the central fuel port. The central port closure plate 119 is then reinstalled and seal welds made. Bolting of the central port closure plate is accomplished. The reactor pit may then be flooded and reactor startup procedures begun.

It will be noted that removal of many of the instrumentation leads through the support flange 62 makes this simple refueling procedure possible since the instrumentation leads passing through the flange 62 do not interfere with refueling in any way.

It will be understood that the invention is not to be limited to the details given herein but that it may be modified within the scope of the appended claims.

What is claimed is:

1. A nuclear reactor comprising a core containing a plurality of vertically disposed seed and blanket fuel assemblies, said seed assemblies containing enriched uranium and said blanket assemblies containing natural uranium, each of said seed assemblies including a control rod channel extending axially of the assembly, control rods having operating shafts extending thereabove capable of axial movement in the control rod channels, tubular shrouds enclosing said control rod operating shafts, and module frames attached to each shroud adapted to bear on a seed assembly and adjacent blanket assemblies to restrain them from vertical movement.

2. A nuclear reactor comprising a core containing a rectangular array of rectangular, vertically disposed, seed and blanket assemblies, said seed assemblies containing natural uranium, said seed assemblies being disposed generally in a ring about a central blanket region and being surrounded by a peripheral blanket region, each of said seed assemblies including a control rod channel extending axially of the assembly, control rods capable of axial movement in said control rod channels, said control rods having operating shafts extending thereabove, tubular shrouds enclosing said operating shafts, module frames attached to the bottom of each of said shrouds each adapted to bear on a seed assembly and adjacent blanket assemblies to restrain them from vertical movement, a central support extending from the top of the fuel assemblies to the top of the reactor, and a module frame attached to the bottom of said support adapted to bear on a plurality of blanket assemblies in the central blanket region to restrain them from vertical movement.

3. A nuclear reactor according to claim 2 which includes 20 seed assemblies and 77 blanket assemblies and wherein the central module frame bears on nine blanket assemblies, each of four corner module frames bears on one seed assembly and five blanket assemblies, and each of 16 side module frames bears on one seed assembly and three blanket assemblies.

References Cited in the file of this patent

UNITED STATES PATENTS

| 2,920,025 | Anderson | Jan. 5, 1960 |
| 2,992,174 | Edlund et al. | July 11, 1961 |
| 2,999,059 | Treshow | Sept. 5, 1961 | is routed through conduits similar to those shown for the flow measurement instrumentation. These conduits (not shown) are routed along the top of and at right angles to the flow measurement conduits 301. The tubes are then carrried up along the inner thermal shield 73 and out of the reactor through the support flange in the same manner as the flow measurement tubing. There is one penetration in the flange 62 for the 97 FEDAL tubes.

The inlet water temperature is taken at 21 fuel assembly locations. The thermocouples 303 (see FIG. 29) are located in the flow stream of the fuel assembly, mounted in the same plane as the spider 100 of the coolant sampling tap. The thermocouples 303 are laid singly along brackets (not shown) placed on top of the FEDAL lines, then converge in conduits that extend up the side of the reactor and out the flange 62.

Thermocouples (not shown) are also provided to measure the temperatures that indicate the temperature gradient and heat generation in the structural components of the core. These thermocouples measure the temperature of the core barrel 70 and of the inner thermal shield 73 at various selected locations. Additional thermocouples measure the temperature at various locations on the upper surface of the upper and lower plates 83 and 84 of the bottom support 75. The temperatures of these structural components are valuable in calculating thermal stresses. These thermocouple leads also pass through the core support flange 62. There are eight penetrations in the flange for the 71 thermocouple leads that pass therethrough.

The shroud instrumentation is designed so that all of the sensing elements can be removed and replaced without interfering with any other reactor component. All thermocouples whose leads are removed through the closure head are individually replaceable. Individual guide tubes 250 (see FIGS. 21–24) are provided to guide each of the thermocouple or differential pressure tubes to their position over the fuel assembly and into the wells in the instrumented seed assembly. Although the guide tubes provide continuous runs, they are made up of three sections. One section runs from the entrance on the mechanism housing to the top of upper shroud section 245; then another section is contained in the upper and middle shroud sections 245 and 246, and the third section is clamped in the scabbards 244 in the lower shroud section 247 and extends over the fuel assembly location. A fourth section of guide tubes is added in the top extension brackets 123 (see FIG. 30) and guides the thermocouples to their correct wells 154 in the instrumented seed fuel plate 153.

The exit water temperature is taken at each fuel assembly. Thermocouples 304 are supported over each seed and blanket assembly by guide tubes 250 mounted in the shrouds 242 and in the module frames 243. These are shown in FIGS. 24 and 25 only, although they are mounted in every shroud 242 and on every module frame 243a, 243b, and 243c.

Guide tubes 250 for the thermocouples 155 used in the instrumented seed assemblies are arranged the same as those described for the exit water thermocouples and no further description is believed necessary.

The core differential pressure is taken at three locations. A static pressure probe is mounted in a guide tube 306 (see FIG. 27) over the central blanket fuel assembly 58 and over two other fuel assemblies in the core 53 and is used in conjunction with the upstream pressure tap 96 of the flowmeter 93 in the same fuel assembly to measure the core differential pressure. The guide tube 306 is mounted in the same manner as are the guide tubes 250 for the removable thermocouples. The static pressure guide tube 306 is mounted so that its end extends into the flow stream at the top exension bracket 123 and holes in the side of the guide tube are located so as to obtain a true static pressure. The guide tube then follows the same path as the thermocouple guide tubes up to the mechanism housing.

Listed below are the design parameters for the reactor core described.

Table I
SUMMARY OF MECHANICAL DESIGN PARAMETERS

| | |
|---|---|
| Active core height (ft.) | 7.5 |
| Mean diameter (ft.) | 7.0 |
| U-235 loading in seed (kg.) | 140 {+15 −0} |
| $UO_2$ loading in blanket (tons) | 22 |
| Number of seed assemblies | 20 |
| Number of blanket assemblies | 77 |

Table II
OPERATING CHARACTERISTICS OF FOUR-LOOP OPERATION

[Flow distribution chosen for no re-orificing]

| | |
|---|---|
| General: | |
| Thermal output, Mw | 350 Mw (th), 100 Mw (e). |
| Total coolant flow, lb./hr.×$10^{-6}$ | 29.0. |
| Leakage flow, lb./hr.×$10^{-6}$ (5.8% of total) | 1.68. |
| Pressure vessel pressure drop, p.s.i. | 53.9. |
| Pressure vessel inlet and exit | 12.0. |
| Friction | 30. |
| Extension brackets | 10.3 |
| Flow meter | 1.6. |
| Inlet coolant temperature, °F | 506. |
| Average coolant temperature, °F | 523. |
| Outlet coolant temperature, °F | 540. |

| | 100 hrs. | 5,000 hrs. | 8,000 hrs. | 10,000 hrs. |
|---|---|---|---|---|
| Seed: | | | | |
| Thermal output, Mw | 158 | 131.5 | 124 | 116 |
| Coolant flow, lb./hr.×$10^{-6}$ | 10.9 | 10.9 | 10.9 | 10.9 |
| Velocity, ft./sec. | 21.7 | 21.7 | 21.7 | 21.7 |
| Heat transfer coefficient, B.t.u./hr.-ft.$^2$-°F.×$10^{-3}$ | 10.3 | 10.3 | 10.3 | 10.3 |
| Heat flux, avg., B.t.u./hr.-ft.$^2$×$10^{-3}$ | 80 | 66.4 | 62.6 | 58.5 |
| Heat flux, max., B.t.u./hr.-ft.$^2$×$10^{-3}$ | 364 | 336 | 339 | 296 |
| Maximum surface metal temperature | 636 | 626 | 626 | 612 |

| | Regions of Orificing | | | |
|---|---|---|---|---|
| | Region 1 | Region 2 | Region 3 | Region 4 |
| Blanket Flow, lb./hr.×$10^{-6}$=16.4: | | | | |
| Assemblies | 9 | 28 | 24 | 16 |
| Coolant flow/assembly, lb./hr.×$10^{-4}$ | 15.1 | 24.9 | 23.6 | 15.1 |
| Total flow/region, lb./hr.×$10^{-6}$ | 1.4 | 7.0 | 5.6 | 2.4 |
| Velocity, ft./sec. | 7.2 | 11.8 | 11.2 | 7.2 |
| Heat transfer coefficient, B.t.u./hr.-ft.$^2$-°F.×$10^{-3}$ | 4.1 | 6.1 | 5.9 | 4.1 |

| | 100 hrs. | 5,000 hrs. | 8,000 hrs. | 10,000 hrs. |
|---|---|---|---|---|
| Blanket: | | | | |
| Thermal output, Mw | 174.5 | 201 | 209.5 | 216.5 |
| Heat flux, avg., B.t.u./hr.-ft.$^2$×$10^{-3}$ | 35.6 | 41.0 | 42.7 | 44.2 |
| Region 1: | | | | |
| Heat flux, max., B.t.u./hr.-ft.$^2$×$10^{-3}$ | 103 | 116 | 130 | 116 |
| Max. surface metal temp. | 612 | 624 | 636 | 625 |
| Region 2: | | | | |
| Heat flux, max., B.t.u./hr.-ft.$^2$×$10^{-3}$ | 142 | 168 | 200 | 208 |
| Max. surface metal temp. | 595 | 613 | 630 | 636 |
| Region 3: | | | | |
| Heat flux, max., B.t.u./hr.-ft.$^2$×$10^{-3}$ | 132 | 162 | 198 | 184 |
| Max. surface metal temp. | 596 | 614 | 636 | 628 |
| Region 4: | | | | |
| Heat flux, max., B.t.u./hr.-ft.$^2$×$10^{-3}$ | 103 | 116 | 130 | 116 |
| Max. surface metal temp. | 612 | 624 | 636 | 625 |